United States Patent
Farrell

(10) Patent No.: US 8,061,239 B2
(45) Date of Patent: *Nov. 22, 2011

(54) RESCUE TOOL

(75) Inventor: Terry C. Farrell, Conneaut Lake, PA (US)

(73) Assignee: Channellock, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 12/419,592

(22) Filed: Apr. 7, 2009

(65) Prior Publication Data

US 2009/0188351 A1    Jul. 30, 2009

Related U.S. Application Data

(63) Continuation-in-part of application No. 11/857,010, filed on Sep. 18, 2007, now abandoned, which is a continuation-in-part of application No. 11/493,682, filed on Jul. 26, 2006, now abandoned.

(51) Int. Cl.
*B25B 7/22* (2006.01)

(52) U.S. Cl. ............... 81/415; 7/138; 7/126; 81/427.5

(58) Field of Classification Search .......... 81/415, 81/427.5, 416, 311, 176.1, 125.1; 7/125–128, 7/137, 138, 166, 129–132

See application file for complete search history.

(56) References Cited

U.S. PATENT DOCUMENTS

| | | | | |
|---|---|---|---|---|
| 354,313 A * | 12/1886 | Galloway | | 7/131 |
| 427,309 A * | 5/1890 | Green | | 7/131 |
| 563,577 A * | 7/1896 | Drum | | 7/100 |
| 836,075 A * | 11/1906 | Loundon | | 7/130 |
| 1,561,647 A * | 11/1925 | Johnson | | |
| 1,936,359 A * | 11/1933 | Huthsing et al. | | |
| 2,360,163 A * | 10/1944 | Sadler | | |
| D210,141 S * | 2/1968 | Woods | | |
| 3,599,255 A * | 8/1971 | Carroll, Sr. | | |
| D226,162 S * | 1/1973 | Zlaylek, Jr. | | |
| D233,405 S * | 10/1974 | Frey | | |
| 3,949,439 A * | 4/1976 | Ardis | | |
| D244,252 S * | 5/1977 | Ardis | | |
| 4,206,663 A * | 6/1980 | Pace | | 81/311 |
| 4,287,623 A * | 9/1981 | Tarran | | |
| D281,216 S * | 11/1985 | Cutliff, Jr. et al. | | |
| 4,597,123 A * | 7/1986 | Cobe, Jr. | | |
| 4,646,378 A * | 3/1987 | Borden | | |
| 5,105,493 A * | 4/1992 | Lugtenaar | | |
| D329,972 S * | 10/1992 | Calvagno | | |
| 5,247,715 A * | 9/1993 | Nishiguchi | | |
| 5,428,853 A * | 7/1995 | Menke | | |
| 6,298,754 B1 * | 10/2001 | Brown | | |
| 6,308,355 B1 * | 10/2001 | McMillan et al. | | |
| 6,397,420 B1 * | 6/2002 | Roxton | | |
| 6,725,486 B2 * | 4/2004 | Oka | | 7/127 |
| 6,899,001 B1 * | 5/2005 | Sanders et al. | | |
| 2004/0261188 A1 * | 12/2004 | Mathis | | |
| 2006/0156474 A1 * | 7/2006 | Gillingham | | |

* cited by examiner

*Primary Examiner* — Hadi Shakeri

(74) *Attorney, Agent, or Firm* — Lackenbach Siegel, LLP

(57) ABSTRACT

A rescue tool includes a fully pivotally opened handle in an obtuse angle disposition with one handle separately gripped and then a force transmitted through force bearing surfaces to the oppositely disposed handle having an outwardly disposed sinusoidal surface and juxtaposed hook end which engage a seized fire hose coupling. A high torque force is readily exerted through the handles on the seized fire hose coupling. The elongate handles and pivotally disposed jaws having elongate arcuate cutting edges corporately provide rapid cutting of aluminum sheath hybrid car battery cables in a further rescue operation.

21 Claims, 11 Drawing Sheets

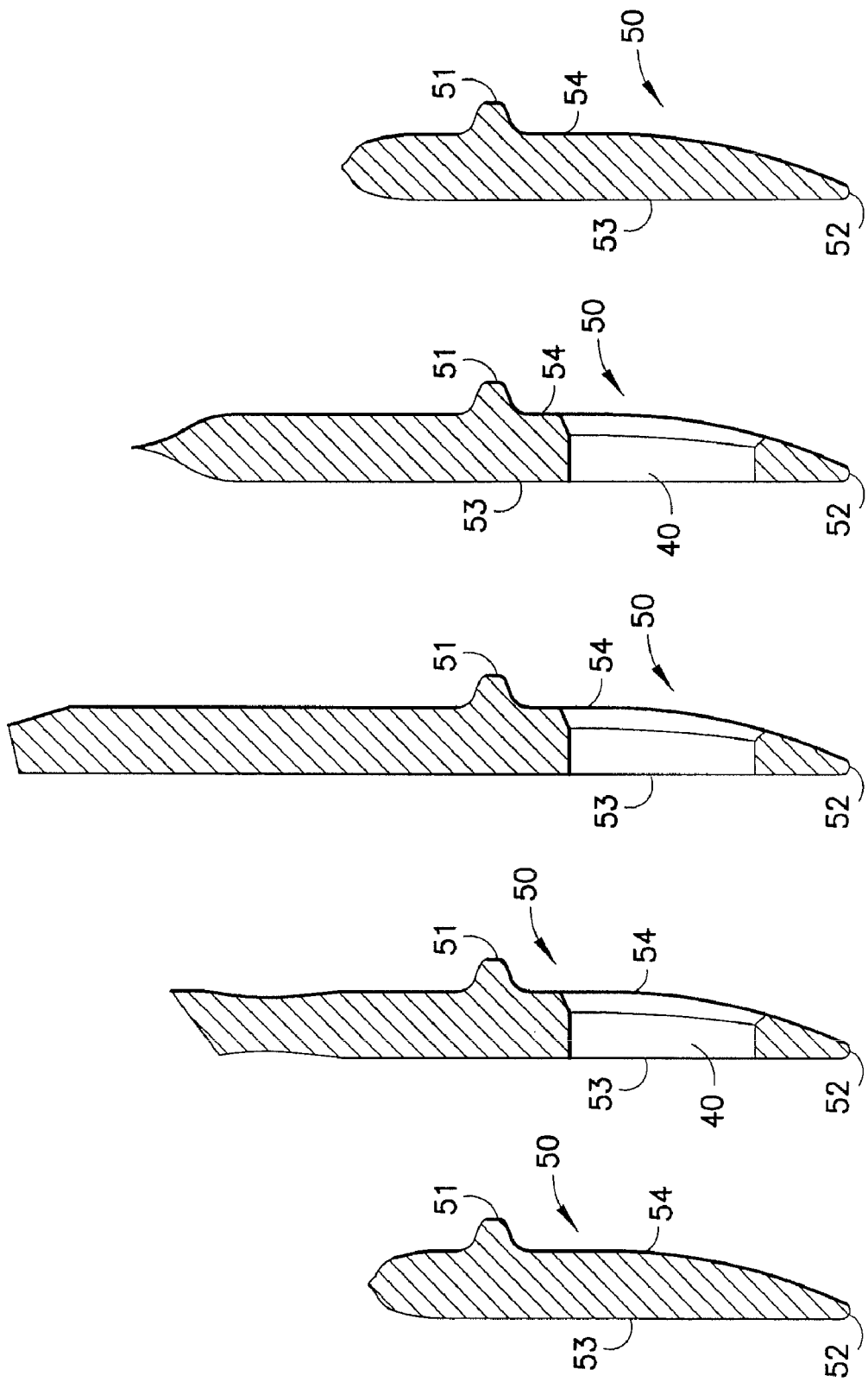

RESCUE TOOL

PRIOR RELATED APPLICATIONS

This application is a continuation-in-part of application Ser. No. 11/857,010, filed Sep. 18, 2007, now abandoned which is a continuation-in-part of application Ser. No. 11/493,682, filed Jul. 26, 2006, now abandoned and claims priority thereto and incorporates the priority applications herein in their entireties by reference thereto.

BACKGROUND OF THE INVENTION

1. Field of the Invention

This invention relates to hand tools. This invention specifically relates to hand tools having improved or multiple functionalities. This invention specifically relates to a firefighter tool having multiple functionalities. This invention more specifically relates to a rescue tool used by firefighters in exigent circumstances.

2. Background of the Prior Art

Firefighter tools having multiple functions are disclosed in U.S. D210,141, granted Feb. 13, 1968 to Woods; U.S. D226,162, granted Jan. 30, 1973 to Zlayele, Jr., U.S. D233,405, granted Oct. 29,1974 to Frey; U.S. D244,252, granted May 10, 1997 to Ardis; U.S. D281,216, granted Nov. 5, 1985 to Cutliff, Jr, et al.; U.S. D 329,972, granted Oct. 6, 1992 to Calvagno; U.S. Pat. No. 1,561,647, granted Nov. 17, 1925 to Johnson; U.S. Pat. No. 2,360,163, granted Oct. 10, 1944 to Sadler; U.S. Pat. No. 3,599,255 granted Oct. 21, 1968 to Carroll, Sr.; U.S. Pat. No. 3,949,439, granted Apr. 13, 1976 to Ardis; U.S. Pat. No. 4,287,623, granted Sep. 8, 1981 to Tarran; U.S. Pat. No. 4,597,123, granted Jul. 1, 1986 to Cobe, Jr.; U.S. Pat. No. 4,646,378, granted Mar. 3, 1987 to Borden; U.S. Pat. No. 5,105,493, granted Apr. 21, 1992 to Lugtenaar; U.S. Pat. No. 5,428,853, granted Jul. 4, 1995 to Menke; U.S. Pat. No. 6,308,355, granted Oct. 30, 2001 to McMillan et al.; U.S. Pat. No. 6,397,420, granted Jun. 4, 2002 to Roxton; U.S. Pat. No. 6,899,001, granted May 31, 2005 to Sanders et al.; and US Publication 2004/0261188, published Dec. 30, 2004 to Mathis.

The art directed to wrenches generally discloses a unitary member having a hook for engaging one specifically sized coupling as disclosed in U.S. D138,515 to Hardy, U.S. D337,492 to Ryan et al. and U.S. Pat. No. 6,705,182 to Bennett.

The art directed to firefighter tools generally discloses a movable or displaceable hook or other movable element to engage diversely sized couplings as disclosed in U.S. Pat. No. 6,298,754 to Brown, U.S. Pat. No. 1,936,359 to Huthsing et al. U.S. Pat. No. 5,428,853 to Menke et al., U.S. Pat. No. 5,247,715 to Nishiguchi.

Referring specifically to FIG. 1 (PRIOR ART), there is shown the multi-purpose rescue tool disclosed in US Publication No. 2006/015674, published Jul. 20, 2006 to Gillingham ("the Gillingham tool"). The Gillingham tool 1 includes handle 7 and handle 8 having a planar contact surface 2 for engaging small sized fire hose couplings (not shown), wherein there is line contact between the coupling cylindrical surface and the handle planar contact surface 2. The Gillingham hook end 3 is curved with a terminal sharp edge 9. Planar contact surface 2 in conjunction with hook end 3 has a limited range of utility. The Gillingham tool is only operable with the handles in the closed position. Handles 7 and 8 open to only a limited degree for cable cutting functionality only. Arm 4 with cutter 5 are disposed on the inside 6 of handle 7 and prevents a user from gripping handle 7. The flared wedge has ends 7a and 7b further prevent a user from griping handle 7.

The Gillingham handles 7 and 8 subtend an angle of no more than about 37° in the fully open position (not shown). This limited open position is for the purpose of the jaws cutting a cable. Hook end 3 has no operability in the handles open position.

Referring specifically to FIG. 2 (PRIOR ART), there is shown pliers 100 with jaws 111 and 112 for cutting a cable (not shown). Jaws 111 and 112 have elongate generally arcuate cutting edges 115 disposed in different planes. In the fully closed position (as shown) stops 113 and 114 limit the closure of jaws 111 and 112. Pliers 100 are useful for only cutting cables with relatively soft metal components. Cutting edges 115 would readily chip in an attempt to cut metal sheath cables.

The art directed to firefighter tools requires quick positive force applications in cutting heavy-duty or metal sheath cables such as present in hybrid automobiles, jimmying seized windows, and opening seized fire hose couplings of diverse sizes and lug configurations. The present invention provides solutions to each and all the foregoing prior art needs in a readily operated tool and yet of practical design, manufacture and construction.

SUMMARY OF THE INVENTION

The present firefighter tool provides complementary elongate handles wherein the handles may, in one operable mode, be separately gripped for cutting heavy duty metal component cables, and in a second mode, the wedge bearing handle is comfortably gripped and the handles fully opened to an extraordinary degree with the opposed handle specifically contoured with a sinusoidal outer surface to operably engage diversely sized and lug configured fire hose couplings. In the handles fully open mode, a high torque force is generated to rapidly uncouple the seized fire hose coupling. The handles open to approximately 114° in the fully opened or second mode position. The elongate contoured handles and elongate arcuate jaws cutting edges provide improved cutting of heavy duty electrical cable such as an aluminum shielded hybrid car battery cable. The wedge edge is disposed at between 85° and 89°, and preferably 88°, of the tool center plane in the fully closed position. The wedge is contoured to be effectively and comfortably separately gripped in the fully opened or second mode position to engagingly the fire hose coupling is engaged by the sinusoidal outer surface and hook of the opposed handle. The elongate handles have specific member handle length ratios and specific respective force bearing surfaces which permit high torque forces to be rapidly exerted on the seized fire hose coupling.

The tool provides for engaging a seized fire hose coupling in the handles fully closed and fully opened positions. The fully closed position is useful in confined space operations such as on a fire truck. The fully opened position is useful in an unconfined space weathered seized coupling operation.

In one embodiment, the tool functions as a cable cutter for rapidly cutting metal sheath cables such as aluminum sheath hybrid car battery cables. The cable cutter has opposed elongate arcuate first and second cutting edges disposed in different planes.

The handles have a specific elongate length ratio to complementarily effect the several afore-discussed rescue operations.

BRIEF DESCRIPTION OF THE DRAWINGS

FIG. 9 is a sectional view taken along line 9-9 of FIG. 8;

FIG. 10 is a sectional view taken along line 10-10 of FIG. 8;

FIG. 11 is a sectional view taken along line 11-11 of FIG. 8;

FIG. 12 is a sectional view taken along line 12-12 of FIG. 8;

FIG. 13 is a sectional view taken along line 13-13 of FIG. 8;

DESCRIPTION OF THE INVENTION

Figure 1:
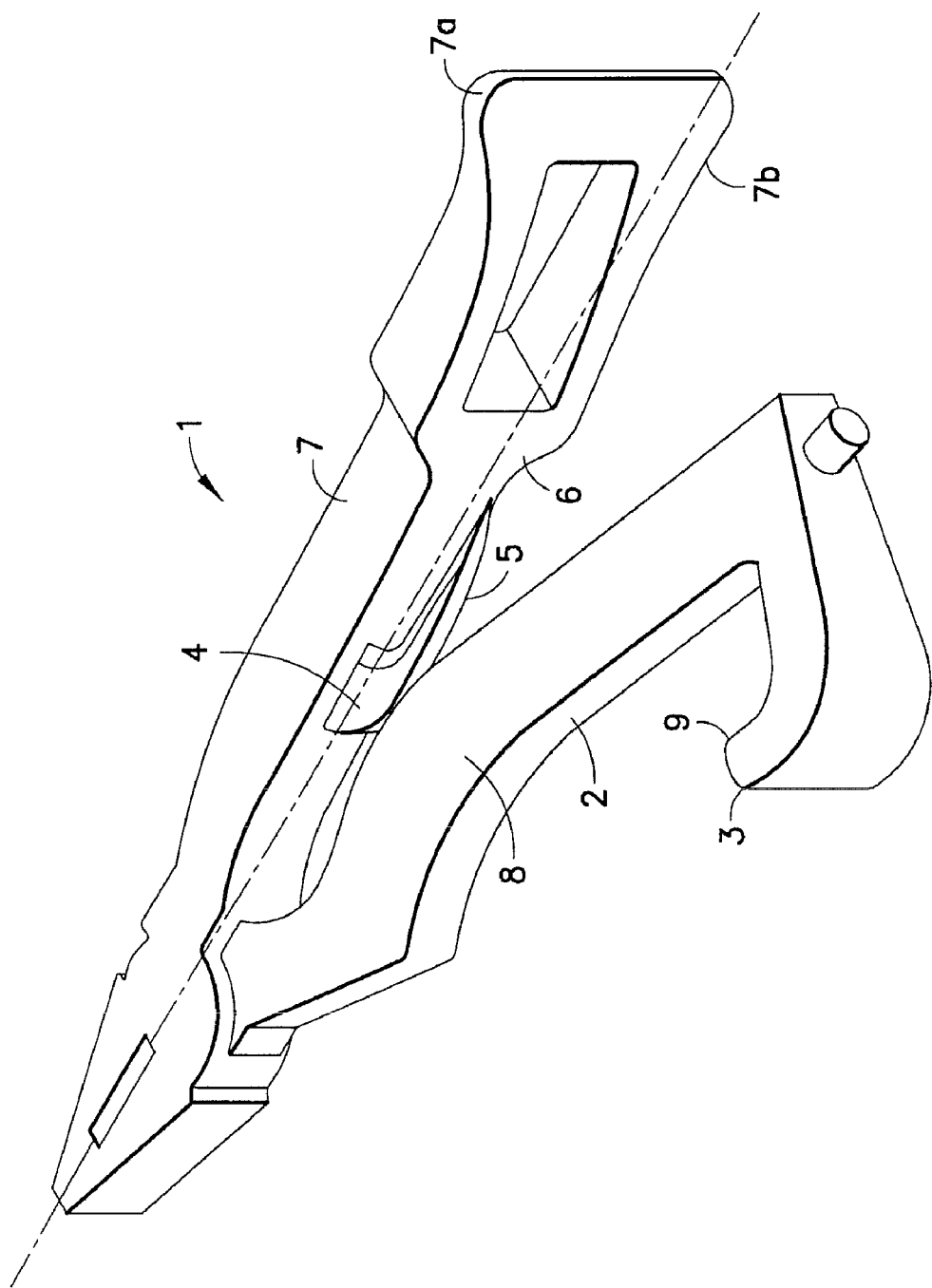
FIG. 1 is a proximate end perspective view of a PRIOR ART multi-purpose rescue tool ("the Gillingham Tool")

Referring to FIGS. 2-18, there is shown rescue or firefighter tool 10. Tool 10 includes members 11 and 12 pivotally connected by pivot member 20 having pivot axis 20A. Member 11 has a proximate end 13 and a distal end 14. Distal end 14 includes jaw 15. Proximate end 13 includes proximately disposed pin 16 and distally extending hook 17, with hook end 31 for purposes hereinafter appearing. Member 12 has a proximate end 21 and a distal end 22. Distal end 22 includes jaw 23. Member 12 includes handle portion 24. Member 11 includes handle portion 25. Jaws 15 and 23 pivotably open and close with the movement of the handle portions 24 and 25, by pivot member 20 and pivot axis 20A.

Handle 25 is formed with a front surface 26, a rear surface 27, an inner surface 28 and an outer surface 30. Outer surface 30 is specifically configured in a generally sinusoidal curvature 35. Surface curvature 35 includes a proximately disposed concave portion 36, a distally disposed convex portion 37, and an intermediate or transitional portion 38, for purposes hereinafter appearing. The respective radii of curvatures 36 and 37 are about equal. Handle 24 includes a wedge 39 formed at proximate end 21. A through hole wrench 40 is disposed between handle portion 24 and wedge 39. Through hole wrench 40 is in about parallel disposition with pivot axis 20A of pivot member 20.

Figure 5:
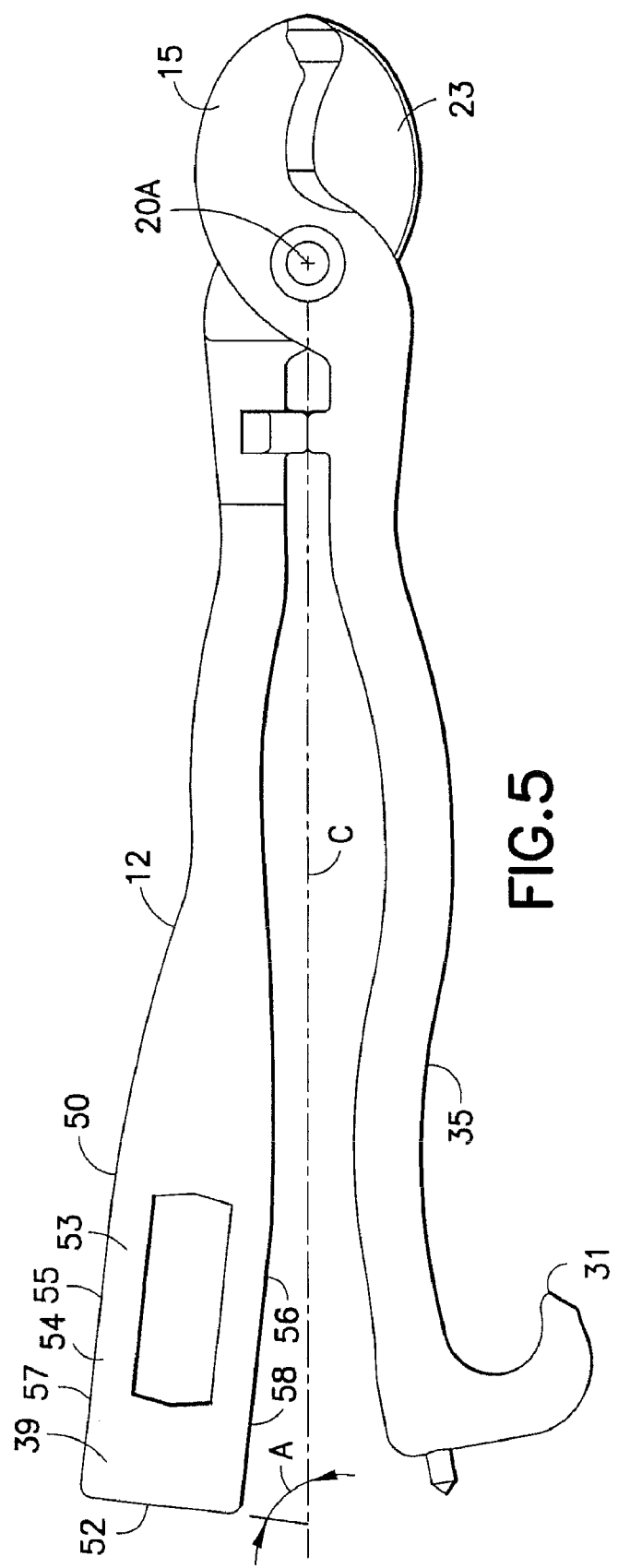
FIG. 5 is a front elevation view of the firefighter tool of the present invention in the fully closed position.
Figure 6:
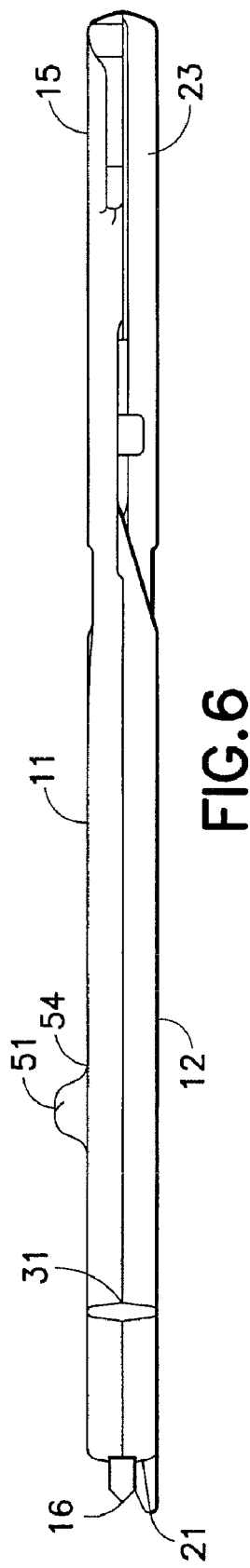
FIG. 6 is a edge wedge side view of the handle of the firefighter tool in the fully closed position.

Referring specifically to FIG. 5, there is shown tool 10 in the fully closed position. Jaws 15 and 23 are slidably contactingly engaged. A user (not shown) grips closed jaws 15 and 23 and use wedge 21 or wrench 40 of member 12. The user (not shown) can otherwise grip closed jaws 15 and 23 and use the so specifically configured surface 35 in cooperation with hook end 31 for uncoupling a fire hose coupling or cap, as more fully discussed hereinafter.

The Wedge Grip and Function

Wedge 39 is contoured to provide a grip 50 disposed between transverse downwardly disposed fulcrum 51 (FIG. 6) and wedge edge 52. Grip 50 includes upper surface 53, lower surface 54 and sides or side surfaces 55 and 56. Upper surface 53 and lower surface 54 extends proximately and upwardly to the wedge edge 52. Wedge sides 55 and 56 extend or bulge outwardly at 57 and 58, between fulcrum 51 and wedge edge 52. In the aforesaid manner of construction, the contoured wedge 39 surfaces provide a grip 50 for member 12 in the fully open position (FIGS. 7 and 19).

Figure 7:
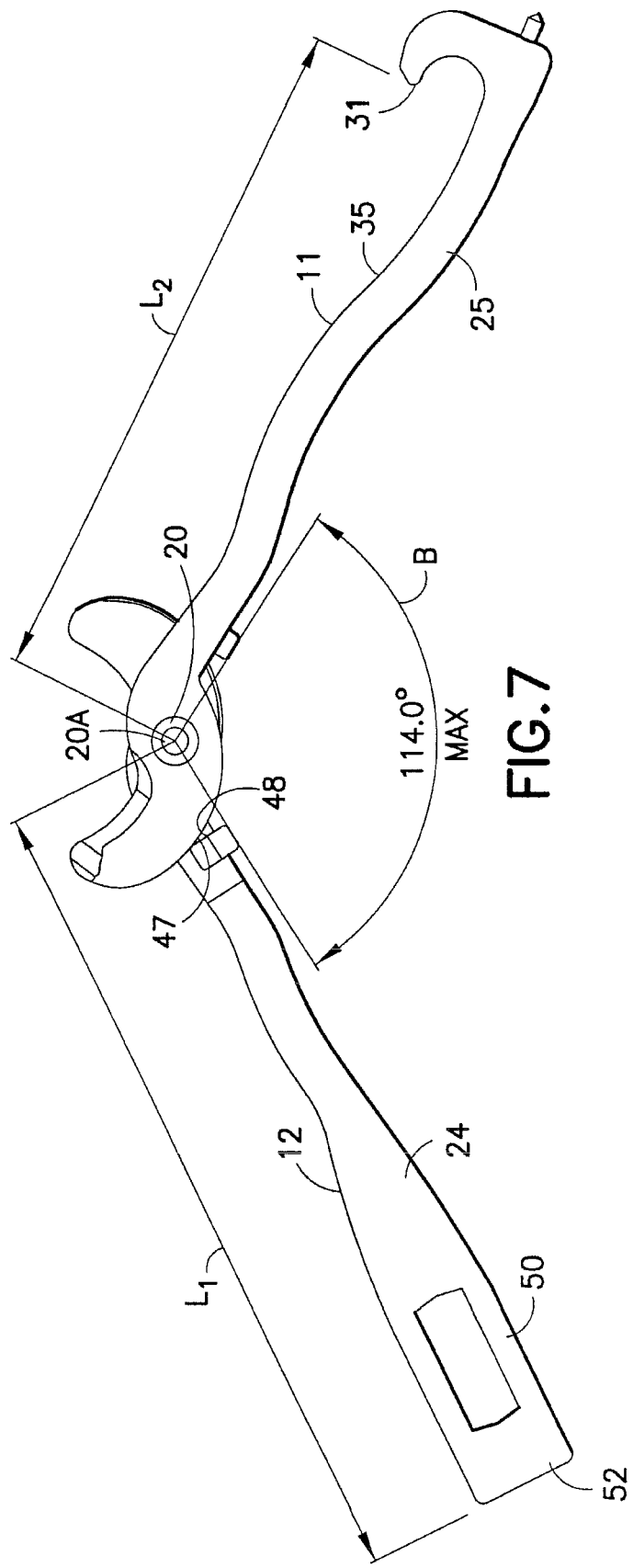
FIG. 7 is a front elevational view of the firefighter tool in the fully open position.
Figure 8:
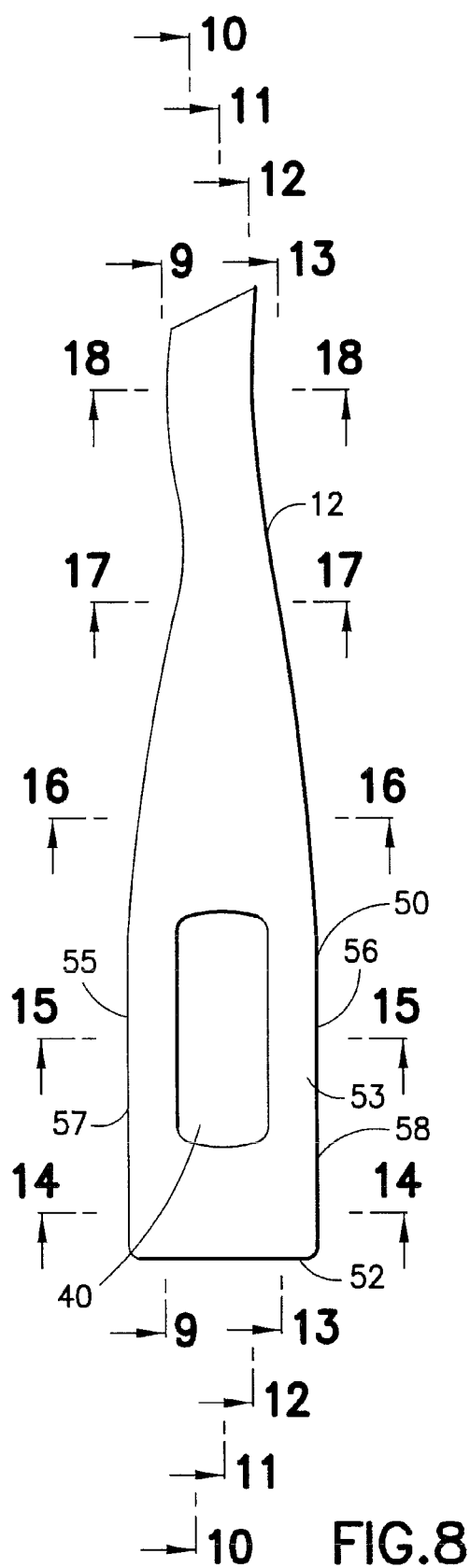
FIG. 8 is a front fragmentary view of the wedge end of the firefighter tool.
Figure 19:
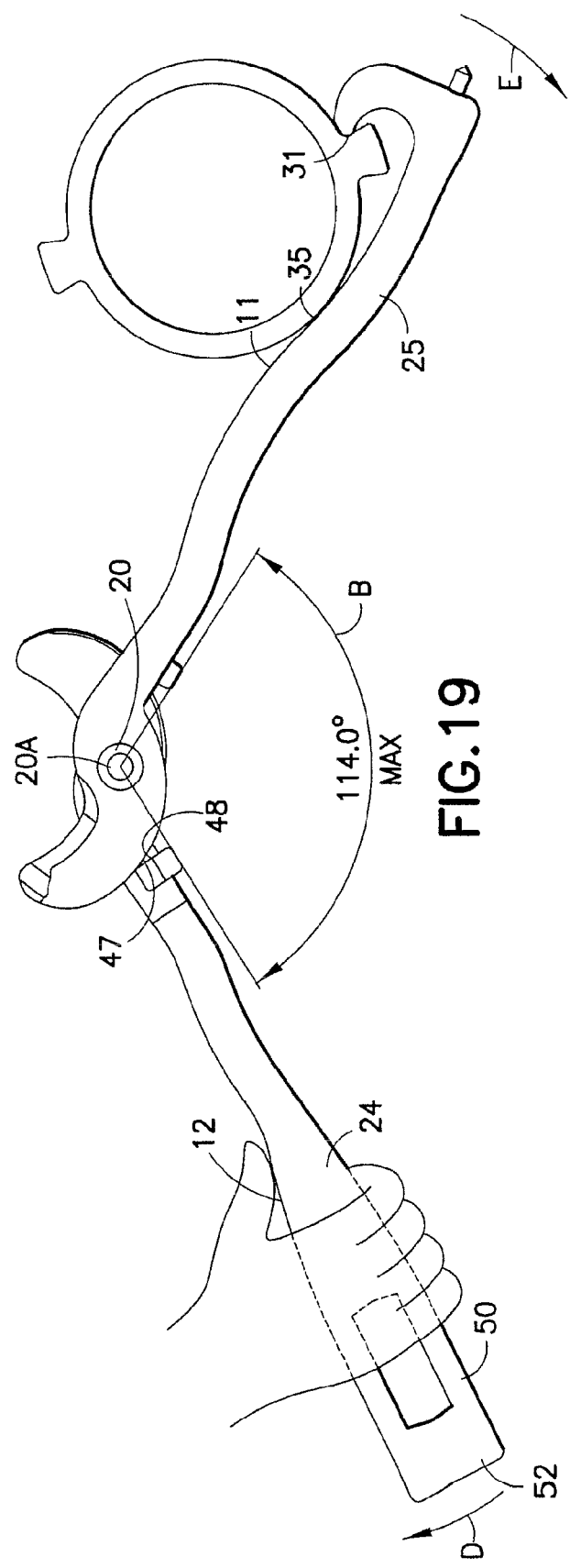
FIG. 19 is a front elevational view as in FIG. 7 showing a firefighter gripping the wedge end of one handle with the fully opened end opposed handle engaged with a seized fire hose coupling.

The present construction is designed to permit members 11 and 12 to open to an angle B of at least about a 100° angle, and preferably 114°, when operated in the fully opened mode (FIGS. 7 and 19). Preferably, the handles are fully opened to an angle of at least about 114°. This large angular disposition in combination with the force transfer bearing surfaces 47 and 48 cause a substantial torque to be transferred from member 12 to member 11 and in turn exerted on the seized coupling. It has been found that when a 250 lb. force is exerted on handle portion 24 of member 12 in both the upward and sideward directions (arrow D of FIG. 19) a resultant 354 lb. force is generated at 45° and transfer to member 11 for resultant angular movement (arrow E of FIG. 19). A Von Mises (WCS) stress analysis reveals that the area of highest stress is not in the pivot member 20 area but counterintuitively at portion 59 of member 12. Pivot member 20 and force bearing surfaces 47 and 48 were found to be surprisingly under low stress in the operable disposition of FIG. 19. This design and construction permits an effective high torque force to be generated and transmitted without damage or deformation in and to the pivot member.

The Wedge Edge

Wedge edge 52 is disposed at a slightly acute angle A with respect to tool center plane or centerline C (FIG. 5). Angle A is about 85° and 89°, and preferably about 88°. The user grips the jaws in the fully closed position and applies a force transversely to the center plane C to exert a leverage force at the wedge edge. In the aforesaid manner of construction, wedge edge 52 readily operably engages a seized window lower edge under exigent circumstances. The wedge edge is preferably operable in the fully closed position, as well as in the fully open position.

The Wedge Grip

Figure 14:
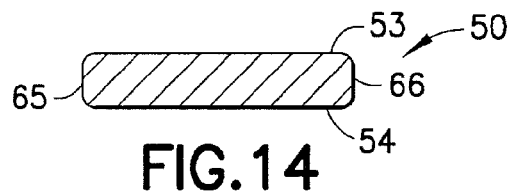
FIG. 14 is a sectional view taken along line 14-14 of FIG. 8.
Figure 15:
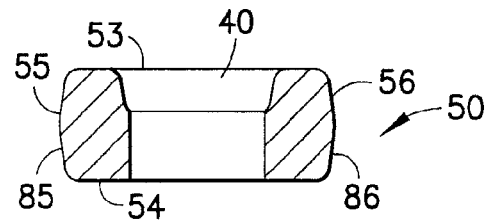
FIG. 15 is a sectional view taken along line 15-15 of FIG. 8.
Figure 16:
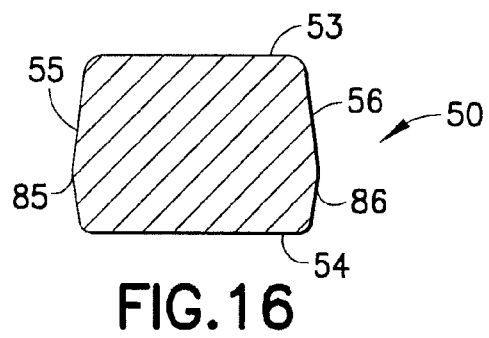
FIG. 16 is a sectional view taken along line 16-16 of FIG. 8.
Figure 17:
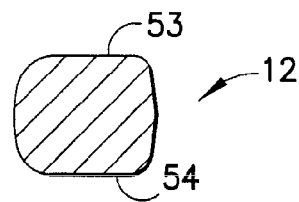
FIG. 17 is a sectional view taken along line 17-17 of FIG. 8.
Figure 18:
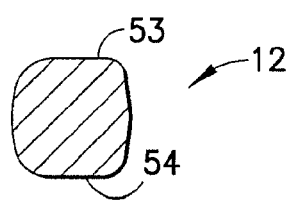
FIG. 18 is a sectional view taken along line 18-18 of FIG. 8.

Referring specifically to FIGS. 7-19, there is shown the wedge grip 50. Wedge grip 50 has a front or upper surface 53, a rear or lower surface 54, an outside surface 55 and an inside surface 56. A wedge fulcrum 51 is formed on rear surface 54. Wrench opening 40 is transversely disposed in grip 50. Surfaces 55 and 56 are spacedly disposed at 57 and 58. Surfaces 55 and 56 have convex contours at 85 and 86 respectively (FIGS. 14-16). In this manner of construction, a grip 50 is provided between fulcrum 51 and wedge edge 52 (FIGS. 14-16). The user fully opens the handles (FIGS. 7 and 19) and grips member 12 at grip 50 and engages a coupling between sinusoidal transfer surface 35 and hook end 31. The user then exerts a force on member 11 through force bearing or transfer surfaces 47 and 48 to surface 35 and hook end 31 and in turn to the coupling lug and cylindrical outer surface. A seized fire hose coupling is readily unseized in the manner of construction and operation as particularly shown in FIG. 19.

The tool of claim 16, the wedge upper and lower surfaces being in about parallel disposition adjacent the fulcrum surface and said wedge lower surface curves towards the upper surface in the proximate direction, wherein the said wedge upper, lower and side surfaces permit the rescue tool to be readily inserted into and removed from a pocket or holster in the fully closed position.

The Handles Length Ratio

It has been found that by providing members 11 and 12 having respective handles 24 and 25, with a specific length ratio, the seized coupling engagement functions are improved. Handle 24 has a length $L_1$ measured from axis 20A to wedge edge 52, and handle 25 has a length $L_2$ measured from axis 20A to hook end 31 (FIG. 7). It has been found that a handle length ration $L_1$:$L_2$ of about 5:4 provides effective torque forces to be exerted from member 12 to member 11 and in turn by sinusoidal surface 35 and hook end 31 on a seized fire hose coupling in the fully open position. The handles length ratio provides complementary effectiveness in the several rescue tool operations as further discussed hereinabove and hereinafter.

The Cable Cutter

Figure 2:
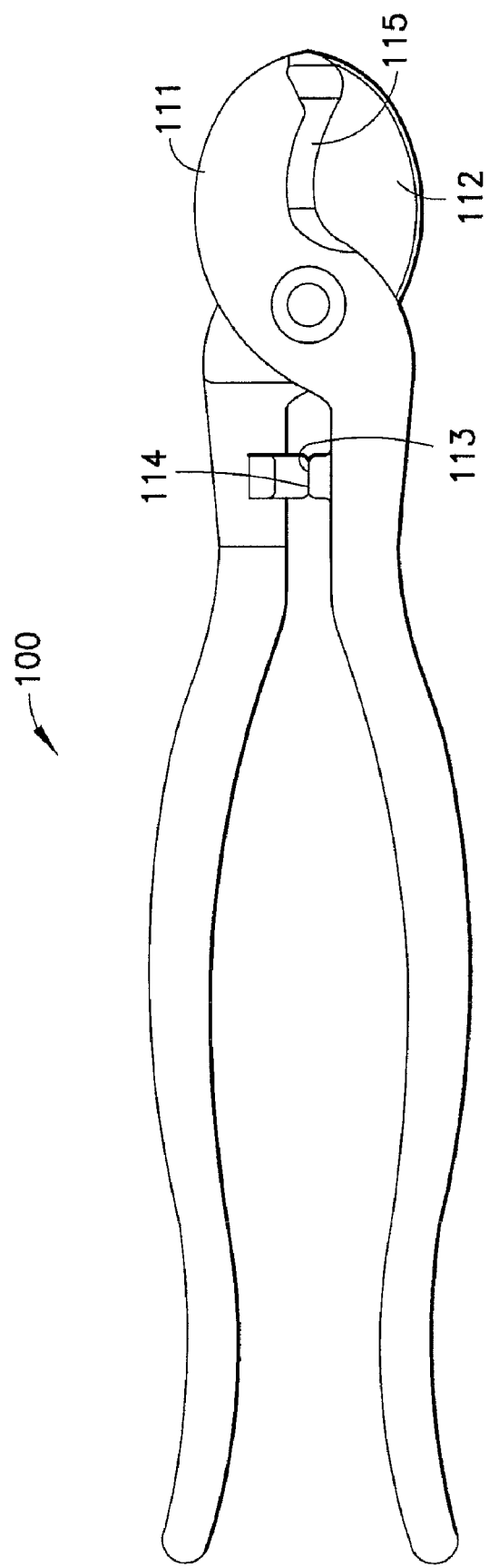
FIG. 2 is a front elevational view of a PRIOR ART cable cutter.
Figure 3:
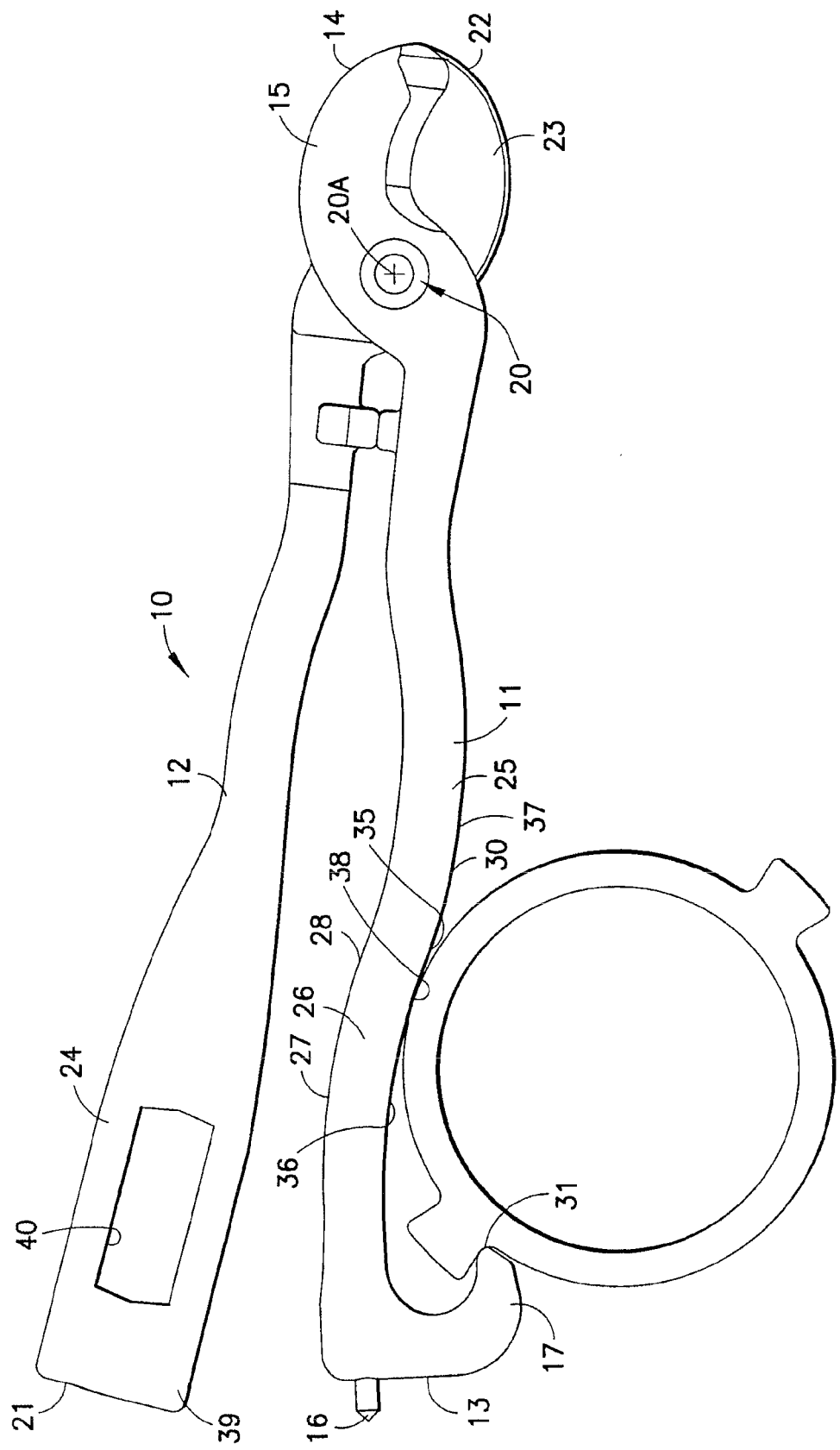
FIG. 3 is a front elevational view of the rescue or firefighter tool of the present invention in a fully closed position and engaging a fire hose coupling.
Figure 4:
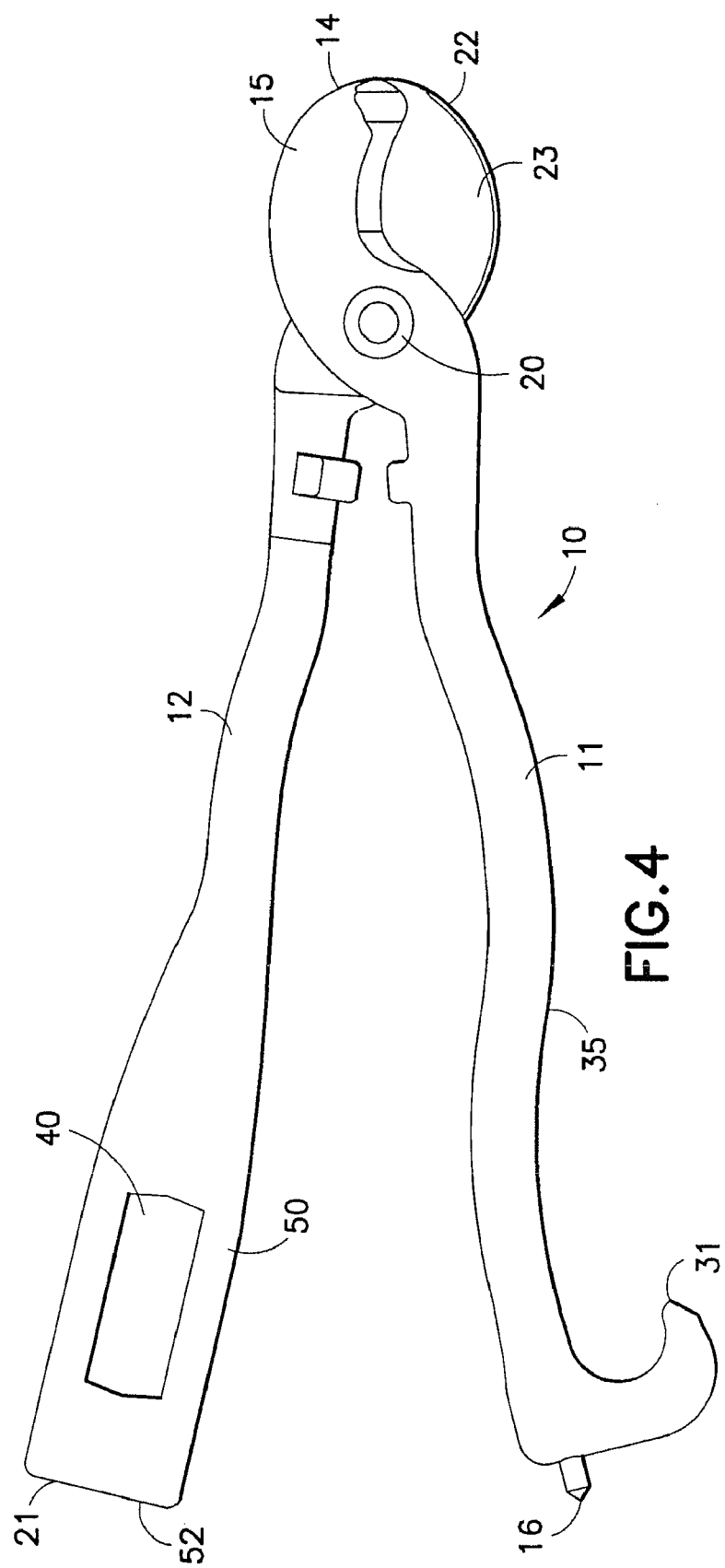
FIG. 4 is a front elevational view of the firefighter tool in a partially open position.

Handles 24 and 25 are generally of greater length than in conventional hand tool cutting pliers (FIG. 2). Jaws 15 and 23 are similar to the construction of the jaws shown in FIG. 2. The present handles construction, and configurations and length ratio construction with jaws 15 and 23 provide heavy duty cable cutter functionality. The cutting force of the present firefighter tool permits the cutting of an aluminum shielded 04 hybrid car battery cable in a single rapid cutting action. The user readily exerts a 120 lb force on the cable. Tool 10 is preferably manufactured entirely of 1080 steel.

Certain firefighter elements viz. wrench 140, and pin 16 are operated in a manner similar to that described in U.S. application Ser. No. 11/857,010, filed Sep. 18, 2007, published as US Pub. No. 20080022813 and U.S. application Ser. No. 11/493,682, filed Jul. 26, 2006, published as US Pub. No. 20080022815, which applications are incorporated herein in their entireties by references thereto.

The foregoing describes a rescue or firefighter tool with a combination of novel and improved functions. The present tool provides a firefighter tool with multi-functionality which is practical in construction and use under exigent firefighter circumstances.

While the present invention has been described by reference to a specific embodiment, it should be understood that modifications and variations of the invention might be constructed without departing from the scope of the invention as defined in the appended claims.

What is claimed is:

1. A firefighter tool comprising:
   in combination with one of differently sized fire hose couplings;
   said tool comprising;
   a first member comprising a proximate end and a distal end, and a proximately disposed first handle and a distally disposed first jaw;
   a second member comprising a proximate end and a distal end, and a proximately disposed second handle and a distally disposed second jaw;
   means for pivotably connecting the members comprising a pivot axis, and being disposed between the handles and jaws so that the handles pivotably move the jaws from a first operable position to a second operable position;
   and said first operable position the jaws and handles are fully closed and in said second operable position the jaws and handles are fully opened said handles subtend an angle of at least about 100° in the second uncoupling position;
   said jaws comprise grip surfaces;
   said jaws and handles having respective force bearing surfaces disposed below the pivot axis and in contacting engagement in the second operable position;
   said first handle comprises a wedge having an elongate edge and said first handle further comprises a grip portion extending around the handle adjacent the wedge;
   said second handle comprises a hook disposed at the proximate end, said second handle further comprises a generally sinusoidal surface, said generally sinusoidal surface comprises a convex portion and a concave portion, said concave portion extending from the convex portion to the second handle distal end adjacent the hook, and wherein the concave portion extends about the same length as the convex portion wherein said generally sinusoidal surface in combination with the hook, wherein the generally sinusoidal surface and hook are in contacting engagement with one of the differently sized fire hose couplings in the second uncoupling position, wherein when a 250 lb. force is exerted on the second member grip portion there is provided a resultant 354 lb. force by the first member generally sinusoidal surface,
   said first operable position comprises a wedge operable position, and said second operable position comprises a fire hose uncoupling position; and
   in the fire hose uncoupling position the firefighter grips the second handle grip portion and exerts a leverage force through the contactingly engaged force bearing surfaces to the second handle generally sinusoidal surface and hook to exert a leverage force to uncouple a seized fire hose coupling; and
   in the wedge operable position, the firefighter grips the jaws grip surfaces and exerts a leverage force to the wedge edge;
   whereby the firefighter uncouples a seized fire hose coupling in the second operable position, and opens a seized window in the first operable position.

2. The tool of claim 1, said wedge edge being angularly disposed from about 85° to 89°.

3. The tool of claim 1, said wedge edge being angularly disposed at about 88°.

4. The tool of claim 1, said jaws being elongate and comprise generally elongate arcuate cutting edges disposed in immediately adjacent planes.

5. The tool of claim 1, wherein said handles open to approximately 114° in the fully opened position.

6. The tool of claim 1, said wedge comprises a transversely disposed fulcrum surface, said grip portion being disposed between about the fulcrum surface and the wedge edge.

7. The tool of claim 6, the wedge comprises upper and lower surfaces being in about parallel disposition adjacent the fulcrum surface and said wedge lower surface curves towards the upper surface in the proximate direction, wherein the said wedge upper, lower and side surfaces permit the rescue tool to be readily inserted into and removed from a pocket or holster in the fully closed position.

8. The tool of claim 1, wherein the ratio of the length of the first handle measured from the axis to the proximate end of the first handle to the length of the second handle measured from the axis to the hook end is about 5:4.

9. The tool of claim 1, said first member jaw comprising an elongate arcuate cutting edge, and said second member jaw comprises an elongate arcuate cutting edge.

10. The tool of claim 9, said first member cutting edge comprises a sharper edge than said second member cutting edge.

11. The tool of claim 10, said second member cutting edge comprises a greater surface area than the first member cutting edge.

12. The firefighter tool of claim 1, said first handle grip portion comprising a lens elongate sectional portion than said wedge edge.

13. The firefighter tool of claim 1, said first handle wedge grip portion comprises oppositely disposed sides that extend outwardly.

14. The firefighter tool of claim 13, said second handle comprises an upper planar surface and said wedge edge comprises an upper planar surface and lower curvilinear surfaces, wherein the wedge upper planar portion is coplanar with the second handle upper surface.

15. A firefighter tool comprising:
in combination with one of differently sized fire hose couplings;
said tool comprising;
a first member comprising a proximate end and a distal end, and a proximately disposed first handle and a distally disposed first jaw;
a second member comprising a proximate end and a distal end, and a proximately disposed second handle and a distally disposed second jaw;
means for pivotably connecting the members comprising a pivot axis, and being disposed between the handles and jaws so that the handles pivotably move the jaws from a first operable position to a second operable position, said handles subtend an angle of at least about 100° in the second uncoupling position;
said jaws comprise grip surfaces;
wherein said first operable position the jaws and handles are fully closed and in said second operable position the jaws and handles are fully opened;
said jaws and handles having respective oposed force bearing surfaces in contacting engagement in the second operable position with the jaws and handles fully opened, said handle force bearing surfaces extend away from the respective handle surfaces and said jaws force bearing surfaces comprise respective curvilinear outer surfaces, and said handle force bearing surfaces are in contacting engagement with the curvilinear outer surfaces in the second operable position;
said first handle comprises a wedge having an elongate edge and said first handle further comprises a grip portion extending around the handle adjacent the wedge;
said second handle comprises a hook disposed at the proximate end, said second handle further comprises a generally sinusoid surface in combination with the hook wherein the generally sinusoidal surface and hook are in contacting engagement with one of the differently sized fire hose couplings in the second uncoupling position, wherein when a 250 lb. force is exerted on the second member grip portion there is provided a resultant 354 lb. force by the first member generally sinusoidal surface;
said first operable position comprises a wedge operable position, and said second operable position comprises a fire hose uncoupling position; and
in the fire hose uncoupling position the firefighter grips the first handle grip portion and exerts a leverage force through the contactingly engaged force bearing surfaces to the generally sinusoidal surface and hook to exert a leverage force to uncouple a seized fire hose coupling; and in the wedge operable position, the firefighter grips the jaw surfaces adjacent the pivot axis and exerts a leverage force to the wedge edge;
whereby the firefighter uncouples a seized fire hose coupling in the second operable position, and opens a seized window in the first operable position.

16. The firefighter tool of claim 15, said first handle grip portion comprising a lens elongate sectional portion than said wedge edge.

17. The firefighter tool of claim 15, said first handle wedge grip portion comprises oppositely disposed sides that extend outwardly.

18. The firefighter tool of claim 17, said second handle comprises an upper planar surface and said wedge edge comprises an upper planar surface and lower curvilinear surfaces, wherein the wedge upper planar surface is coplanar with the second handle upper surface.

19. A firefighter tool comprising:
In combination with one of the differently sized fire hose couplings;
a first member comprising a proximate end and a distal end, and a proximately disposed first handle and a distally disposed first jaw;
a second member comprising a proximate end and a distal end, and a proximately disposed second handle and a distally disposed second jaw;
means for pivotably connecting the members comprising a pivot axis, and being disposed between the handles and jaws so that the handles pivotably move the jaws from a first operable position to a second operable position;
said jaws comprise grip surfaces;
wherein said first operable position the jaws and handles are fully closed and in said second operable position the jaws and handles are fully opened, wherein the handles are disposed at least at 100° in the fully opened position;
said jaws and handles having respective opened force bearing surfaces disposed below the pivot axis, said jaws force bearing surfaces comprise outer surfaces, said handle force bearing surfaces are in contacting engagement with the jaws curvilinear outer surfaces in the second operable position with the handles and jaws fully opened;
said first handle comprises a wedge having an elongate edge and said first handle further comprises a grip portion extending around the handle adjacent the wedge;
said second handle comprises a hook disposed at the proximate end, said second handle further comprises a generally sinusoid surface in combination with the hook, wherein the generally sinusoidal surface and hook are in contacting engagement with one of the differently sized fire hose couplings in the second uncoupling position, wherein when a 250 lb. force is exerted on the second member grip portion there is provided a resultant 354 lb. force on the first member generally sinusoidal surface;
said first operable position comprises a wedge operable position, and said second operable position comprises a second fire hose uncoupling position; and
in the fire hose uncoupling position the firefighter grips the first handle grip portion and exerts a leverage force through the contactingly engaged force bearing surfaces to the second handle generally sinusoidal surface and hook to exert a leverage to uncouple a seized fire hose coupling; and in the wedge operable position, the firefighter grips the jaw surfaces adjacent the pivot axis and exerts a leverage force to the wedge edge;

whereby the firefighter uncouples a seized fire hose coupling in the second operable position, and opens a seized window in the first operable position.

20. The firefighter tool of claim 19, said first handle wedge grip portion comprises oppositely disposed sides that extend outwardly.

21. The firefighter tool of claim 20, said second handle comprises an upper planar surface and said wedge edge comprises an upper planar surface and a lower curvilinear surface, wherein the wedge upper planar surface is coplanar with the second handle upper surface.

* * * * *